March 20, 1928.
V. A. WIRT
1,663,430
LOOSE LEAF BINDER
Filed June 8, 1925
3 Sheets-Sheet 2
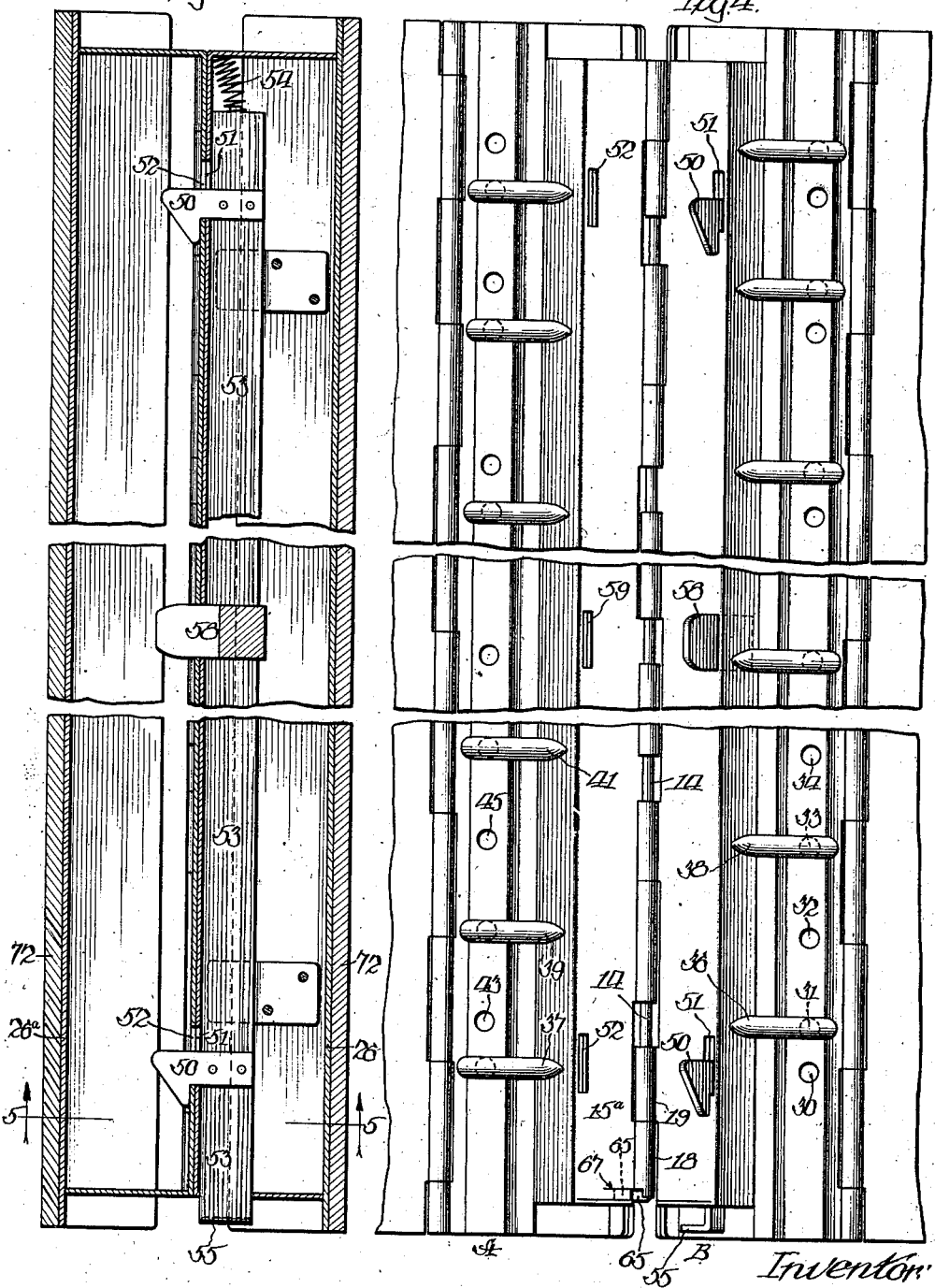

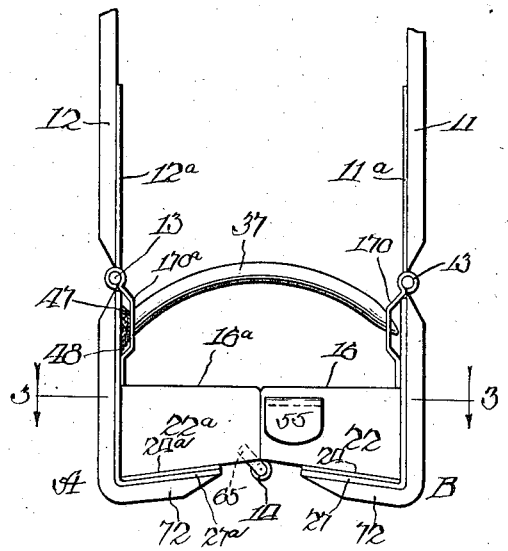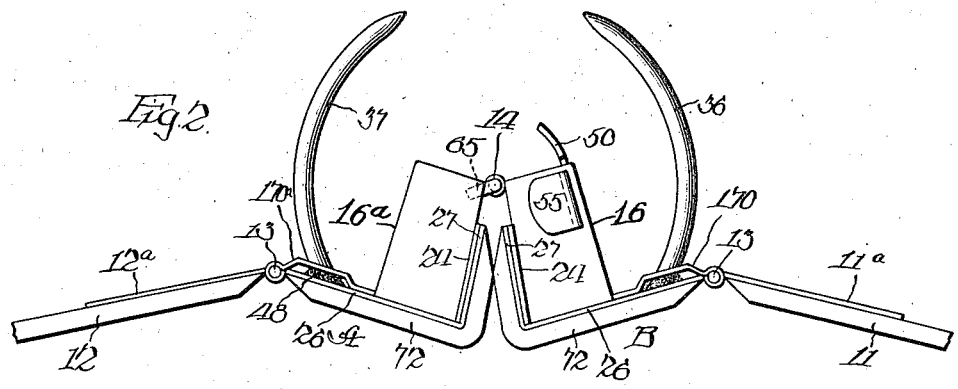

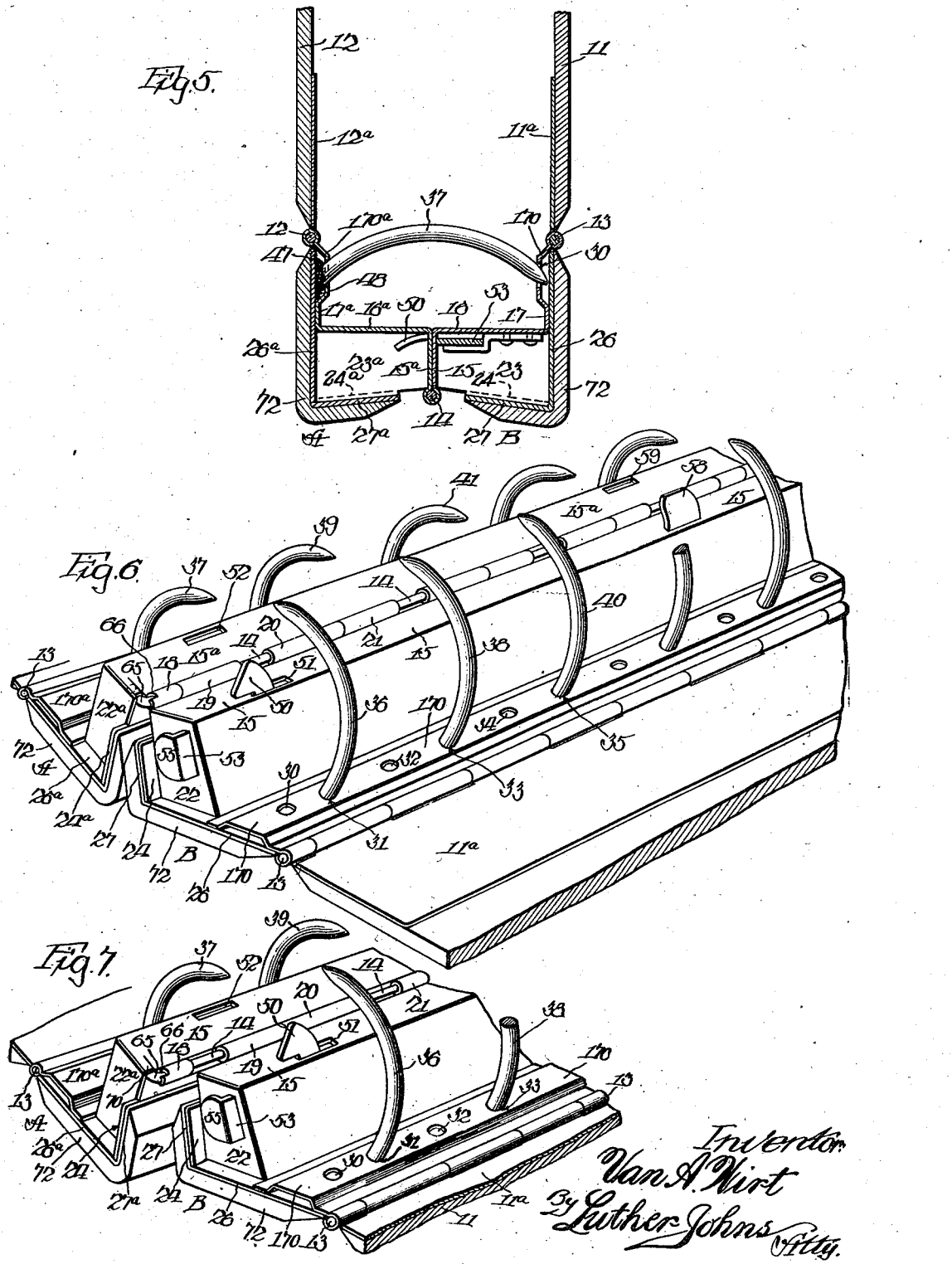

Patented Mar. 20, 1928.

1,663,430

UNITED STATES PATENT OFFICE.

VAN A. WIRT, OF CHICAGO, ILLINOIS, ASSIGNOR TO VISIBLE RECORDS EQUIPMENT COMPANY, A CORPORATION OF ILLINOIS.

LOOSE-LEAF BINDER.

Application filed June 8, 1925. Serial No. 35,573.

The present improvements relate to looseleaf binders of the pronged book-form type. One object is to simplify the construction of the body members. Another is to provide an unusually strong and durable device, and one having parts which may be easily formed and readily assembled, making for savings in cost. A specific object is to provide a binder in which the prongs are secured to the body members in a peculiarly strong and rigid way while at the same time avoiding certain unsightliness and other disadvantages due to flowing metal at and around the prongs in the welding operations. It is an object also to provide simple and advantageous means for holding the hinge-pin in such devices against working out. Another object is to provide for insuring the proper relationship and a secure locking of the two body members when moved from open to closed position in devices of the kind in which one body member may move or shift longitudinally with respect to the other, referring more specifically to the kind shown in the patent to Martin, No. 1,269,479, of June 11, 1918. Other objects and advantages will appear hereinafter.

In the drawings Figure 1 is a fragmentary end elevation of my improved binder in closed position; Fig. 2 shows the parts of Fig. 1 in open position; Fig. 3 is a fragmentary sectional view on the line 3—3 of Fig. 1; Fig. 4 is a fragmentary top plan of the device in the open position of Fig. 2; Fig. 5 is a sectional view as on the line 5—5 of Fig. 3; Fig. 6 is a fragmentary perspective of the device in the open position, and Fig. 7 is a fragmentary perspective of end parts of Fig. 6 showing the body members shifted longitudinally relative to each other.

The device includes certain fundamental parts such as lids or covers 11 and 12 secured upon metal parts 11ª and 12ª hinged at 13 upon the respective body members A and B and the two body members are hinged together at 14.

One feature of improvement is in the construction of the body members. From the sectional view of Fig. 5 it will be noted that each body member comprises an integral longitudinally extending sheet-metal structure having a section 15, a section 16 shown as being at right angles to the section 15, and a section 17 shown as being in general at right angles to the section 16. These three parts 15, 16 and 17 may be described as a structure substantially Z-shaped in cross view, and, speaking generally, it is old to provide such a Z-shaped structure in looseleaf binders. In the present improvements the hinge-pin 14 passes through knuckles which are formed alternately on the parts 15 and 15ª, as, for instance, the knuckle 18 on the part 15ª, the knuckle 19 on the part 15, the knuckle 20 on the part 15ª, the knuckle 21 on the part 15, etc. (Figs. 6 and 7). The flies 11ª and 12ª, are hinged to the parts 17 and 17ª respectively at the edges respectively of certain projecting formations 170 and 170ª. The respective parts 16 and 16ª have integral end walls 22 and 22ª (Fig. 1) and 23 and 23ª (Fig. 5), and these end walls are respectively provided with out-turned lips or flanges such as 24 and 24ª (Figs. 6 and 7).

A member comprising the parts 26 and 27 longitudinally extending from end to end of each body member and substantially Lshaped in cross view is secured to each of the substantially Z-shaped members described. Referring to the right-hand side of Fig. 5 for a description common to both sides, this L-shaped member has a lateral part 26 and an inwardly directed end part 27, and this part 27 overlies the flange 24 and is rigidly secured to it as by spot-welding. The part 26 overlies the Z-shaped member part 17 and its formation 170 and is secured thereto also as by spot-welding.

Each body member A and B thus comprises a structure which includes a substantially rectangular casing or hollow frame defined by walls as 15, 16, 26, and 27, the opposite ones of these walls being spaced apart to a materially great extent and providing thereby an unusually strong frame immediately adjacent to the hinge pin, and proceeding thence there is a double thickness of the metal in the frame parts at 17 and 26 extending beyond the housing part described. A feature of improvement is in the strengthening of that part of the frame carrying the prongs, namely (according to these improvements) the frame parts 17 and 26. From Fig. 5 it will be noted that the frame part 17 is formed at 170 to stand away from the part 26 a material distance, for instance about three thirty-seconds of an inch, as in my practice, thus adding greatly to the strength of the structure in that general locality and at the same time providing for a concealed seat for the prongs, for strengthening the prong connections, for avoiding the bad appearance due to the presence of flowed metal at the prong connections, and for providing recesses for the free ends of the oppositely-disposed prongs. These several advantages will be described in more detail.

From Figs. 6 and 7 it will be noted that the raised part 170 contains a line of holes 30, 31, 32, 33, 34, 35, etc., and that prongs 36, 38, and 40 etc., issue through the alternate holes 31, 33 and 35 respectively, while the oppositely-mounted prongs 37, 39 and 41 have their free ends in line to enter the holes 30, 32 and 34 respectively; and in Fig. 5 it will be noted that the free end of the prong 37 has entered the hole 30 and is therefore protectively covered by the raised part 170. It is to be understood that the free ends of the prongs 36, 38, 40, etc., on the body member B correspondingly enter holes on the raised part 170ª of the opposite body member, and Fig. 4 shows a hole 43 adapted to receive the prong 36, a hole 45 adapted to receive the prong 38, with the same arrangement extending from end to end of the device.

From Figs. 1 and 5 it will be noted that the stippling at 47 and 48, indicating the metal which has flowed while spot-welding the prong 37 to the frame part 26ª, extends along the surface of the prong 37 even to the opening in the frame part 170ª through which the prong extends. The prongs respectively extend through the openings in this raised part 170 or 170ª with a substantially nice fit and the spacing of the part 170ª from the part 26ª, coupled with the substantially neat fit between the prong 37 and the opening through which it extends adjacent to the base of the prong provides a rest or fulcrum for the prong, thereby greatly strengthening the connection of the prong with the body member. However, since the molten metal due to the spot-welding operation creeps along the prong a considerable distance, the effect in practice is that this flowed metal as at 47 and 48 fills the prong opening in the part 170ª, sealing it with a neat finish and at the same time making a fused connection between the prong and the part 170ª, and thus greatly strengthening the connection. It is to be understood that the same is true at each connection of a prong with a body member.

A further important advantage of this construction is that the unsightly fused metal where it creeps along the prong is hidden by the projecting part 170 or 170ª. Furthermore, the fused metal creeping along the prong increases its thickness and gives it an irregular shape and a roughened surface, all of which is prejudicial to the smooth and easy manipulation of the cards or sheets adjacent to the connection. These and other disadvantages are obviated through the present feature of extending the part 170 or 170ª in spaced relation to the part 26 or 26ª against which the prong abuts and to which its end is welded.

Fig. 6 shows at several places the hinge pin 14 free of knuckles, and the arrangement is such, following the disclosure of the Martin patent mentioned, that one body member may be moved longitudinally on the hinge pin relative to the other. The reasons for and advantages of this will be understood by referring to said Martin patent. Fig. 7 shows the two body members in the shifted position. The feature of improvement immediately next to be described has an important relation to loose-leaf binders having such a shift provision.

All such binders are provided with means for locking the swinging members in their closed position. I have shown means for this purpose including a pair of catches 50 (Figs. 3 and 4) projecting through slot-like openings 51 in the part 15, the opposite part 15ª having slot-like openings 52 transversely in line with the openings 51 respectively and adapted to receive the latch heads 50 respectively. These heads 50 are mounted on a longitudinally-extending flat bar 53 (Figs. 3 and 5), and a coiled expansion spring 54 (Fig. 3) forces this bar in one direction while the finger piece 55 at the exposed end of the bar 53 provides means for pushing the bar against this spring pressure in the opposite direction. No invention is claimed by me in this latch or locking device alone and independently of other features as the same is substantially disclosed in the patent to Buchanan No. 683,019 of September 24, 1901.

It will be noted that in order that the latches 50 shall function in their indicated manner they must be moved to the right as viewed in Fig. 6, and then after entering the respective openings 52 the spring 54 moves them back and into holding relation with the metal of the wall 15ª. These heads 50 are made with a slanting front surface so that under certain conditions when the two body members are moved toward each other the latches will automatically be forced aside against spring pressure until they shall have passed into the holes 52 respectively. Since, however, the two body members are shiftable longitudinally on the hinge pin 14 relative to each other it happens that these slanting surfaces on the latches 50 tend to shift the binder members longitudinally when the binder body members are normally closed. For this reason (and another to be enumerated) I provide means for insuring that the two body members, having been placed in their proper relation for closing, shall close together in a fixed path and without the possibility of one of them shifting relative to the other. These means include a projection 58 (Fig. 4) secured rigidly to wall 16 so as to project from the wall 15 towards the wall 15ª, the front end of this projection 58 being slightly tapered or rounded whereby the projection 58 will readily enter the slot-like opening 59 in the wall 15ª, and the arrangement is such that when the body members A and B are substantially adjusted into their relative positions for closing and they are then moved towards each other on their hinged connection the projection 58 will enter the opening 59 before the latch heads 50 enter into such engagement with the metal defining the openings 52 respectively as to force the two body members in opposite directions on the hinge pin, and the body members must therefore go together in straight-across lines, and thereupon the latches 50 are forced in one direction against spring pressure until they pass through their locking apertures respectively and then automatically become caught. The second advantage of the guiding or centralizing projection 58 is that when the book is closed it is locked by these means against longitudinal shifting movement of one side with respect to the other. The catches 50 serve to hold the body members together but do not serve to prevent longitudinal movement between them. With the catches 50 alone installed, should the book fall or be set down heavily on the lower part of one side member longitudinal shifting would occur and the book would probably fall open. A new and valuable combination is thus effected between the latching means and the guiding or centralizing means, and together they constitute locking means for preventing shifting movement as well as swinging movement of the body members with respect to each other.

It is customary in loose-leaf binders to provide some means for preventing the hinge pin from working out and various suggestions have been made to this end. According to the present improvements in this respect I provide a hinge pin which has one end bent substantially at right angles to form a laterally-extending part 65 (Figs. 2, 6 and 7). By cutting away, as at 66, a portion of the knuckle 18 (Figs. 6 and 7) space is provided for accommodating this turned-over end of the hinge pin, and by cutting through the metal of the wall 15ª at 67 (Fig. 4), a small strip of metal 70 free at one end is formed and this may be bent up to permit the hinge-pin end 65 to be swung around behind the plane of the wall 15ª, and then by turning back this small strip 70 the turned-over part 65 is locked against turning movement. Since the knuckle 18 is formed from the metal of the wall 15ª there is no relative movement between these parts, so that opening and closing the book merely turns the hinge pin 14 in the knuckles of the other body member as B. From Figs. 6 and 7 it will be noted that this turned-over part 65 lies also behind the end wall 22ª and thus the pin is held against outward movement. Should it be desired to remove the hinge pin the small lip of metal covering it may be raised out of the way and the hinge pin turned around partly and then withdrawn.

The covers or lids 11 and the back 72 are usually of fibre or cloth or leather-covered cardboard. The rest of the device is of metal and can be made according to ordinary manufacturing methods and means.

The body members made as herein disclosed call for simple forming operations as to the parts, and the assembling of the parts and spot-welding of them together into a rigid structure is also notably easy and expeditious, and at the same time an unusually strong and advantageously-shaped device is made, and one overcoming many objections.

I contemplate as being included in the present improvements such changes, modifications and departures from what is specifically herein illustrated and described as fall within the scope of the appended claims.

I claim:

1. In a loose-leaf binder, the combination of a pair of longitudinally-extending metallic parts having opposed portions lying substantially parallel with each other and spaced apart, said parts being secured in rigid relation to each other, one of said parts having a plurality of longitudinally spaced-apart apertures therein, prongs projecting through said apertures respectively and having their inner ends abutting and spot-welded to the other of said parts, the arrangement providing that the opposed portions are sufficiently spaced-apart at said apertures to cover and conceal the flowed metal at the welded ends of the prongs.

2. In a loose-leaf binder, the combination of a pair of longitudinally-extending metallic parts having opposed portions lying substantially parallel with each other and spaced apart, said parts being secured in rigid relation to each other, one of said parts having a plurality of longitudinally spaced-apart apertures therein, prongs projecting through said apertures respectively and having their inner ends abutting and spot-welded to the other of said parts, the prongs closely interfitting with the apertures respectively to provide a two-part support for the prongs respectively.

3. The combination of claim 2 hereof in which flowed metal of the welding operation in securing the prongs to one of said parts extends around the prongs at the apertures respectively to make a strong connection thereat.

4. In a loose-leaf binder, the combination of two longitudinally-extending body members mounted to swing in directions away from and toward each other into open and closed positions respectively, each of said members including a part having a row of prongs abutting against and rigidly secured thereto at one end of the prongs respectively, the fixed ends of each row of prongs being substantially in a line extending longitudinally, the prongs of each member overlapping in longitudinally-spaced relation those of the other member, and the free ends of the prongs of each member reaching to a place near the longitudinal line of the fixed ends of the other member, an apertured longitudinal member lying alongside and substantially parallel with each part to which the rows of prongs are respectively secured, the fixed end portions of the prongs extending through the apertures respectively and said apertured members having other apertures adapted to receive the free ends of the prongs of the oppositely-disposed part when the body members are in normally closed position.

5. In a loose-leaf binder, the combination of two prong-containing members mounted to shift longitudinally with respect to each other and to swing in directions away from and toward each other into open and closed positions respectively, interengaging catch means carried by said members for holding the members in closed position, and interengaging means independent of any of the prongs carried by the members for automatically holding the members against longitudinal shifting movement when the members are normally moved from the open into the closed position thereof.

6. In a loose-leaf binder, the combination of two prong-containing members mounted to shift longitudinally with respect to each other and to swing in directions away from and toward each other into open and closed positions respectively, interengaging catch means carried by said members for holding the members in closed position, and a locking element independent of any of said prongs and rigid with one of said members and projecting toward the other thereof, said other thereof having means for engaging said locking element to hold the members against longitudinal shifting movement when the members are normally moved from the open into the closed position thereof.

7. In a loose-leaf binder, the combination of two prong-containing members mounted to shift longitudinally with respect to each other and to swing in directions away from and toward each other into open and closed positions respectively, a spring-pressed locking catch having a bevelled free end mounted to move in the longitudinal directions of the device and carried by one of said members and directed toward the other thereof, rigid holding means on the other member adapted to engage with and force said catch in one longitudinal direction against its spring pressure during the closing and locking operation, the bevelled free end of the catch being such with respect to the shifting movement of the members as to tend to shift said members longitudinally out of their normal closed position with respect to each other when the catch is being moved into locking engagement with said holding means, and interengaging means independent of any of said prongs carried by said members for holding the members against such shifting movements when the members are normally moved into their closed and locked position.

8. In a loose-leaf binder the combination of two body members each comprising a leaf member with knuckles, a hinge-pin extending through the knuckles, each body member having an end wall closely adjacent to one end of the hinge-pin, one end of the hinge-pin having a laterally-extending stop, the end knuckle adjacent to said stop being recessed to accommodate the stop and form a lock adapted to maintain it against turning relative to said knuckle, said stop extending behind the end wall of the body-member having said end knuckle.

9. In a loose-leaf binder the combination of a pair of longitudinally-extending frame members each substantially Z-shaped in cross section and hinged together at corresponding free edges to form a trough-shaped structure having a bottom wall and having upstanding side walls substantially parallel with each other when the hinged portions are face to face in the closed position of the members, each of said members having end walls, each of said members having secured thereto a substantially L-shaped member extending longitudinally therewith, one leg of each of said L-shaped members forming a wall spaced from the bottom part of the member to which it is secured, the other leg of the L-shaped member forming an upstanding wall extending along the side wall of the member to which it is secured, a plurality of prongs secured to said L-shaped member upstanding wall, the side wall of said Z-shaped structure adjacent to said upstanding wall having apertures for said prongs respectively and the prongs projecting through said apertures respectively when the binder is normally closed, the prongs of one member projecting in general direction toward the other member, and cover-holding means hinged to each member at what is normally the top edge thereof.

VAN A. WIRT.